(12) United States Patent
Balachandran et al.

(10) Patent No.: US 8,750,240 B2
(45) Date of Patent: Jun. 10, 2014

(54) SYSTEM, METHOD, AND APPARATUS FOR IMPROVED SPACE-TIME CODING AND DYNAMIC SWITCHING WITH ADVANCED RECEIVERS

(75) Inventors: Kumar Balachandran, Pleasanton, CA (US); Havish Koorapaty, Saratoga, CA (US); Rajaram Ramesh, Raleigh, NC (US); Tripura Ramesh, legal representative, Raleigh, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 990 days.

(21) Appl. No.: 12/561,711

(22) Filed: Sep. 17, 2009

(65) Prior Publication Data

US 2011/0064043 A1     Mar. 17, 2011

(51) Int. Cl.
*H04W 4/00*     (2009.01)

(52) U.S. Cl.
USPC .......................................... 370/330; 370/328

(58) Field of Classification Search
USPC ................................................. 370/330, 328
See application file for complete search history.

(56) References Cited

U.S. PATENT DOCUMENTS

| 2003/0128658 | A1* | 7/2003 | Walton et al. | 370/208 |
| 2008/0298524 | A1* | 12/2008 | Koorapaty et al. | 375/348 |
| 2009/0022098 | A1* | 1/2009 | Novak et al. | 375/260 |
| 2009/0219849 | A1* | 9/2009 | Alpert et al. | 370/312 |

FOREIGN PATENT DOCUMENTS

| EP | 1 770 938 A2 | 4/2007 |
| EP | 2 144 470 A1 | 1/2010 |
| WO | WO 2009/073744 A2 | 6/2009 |

OTHER PUBLICATIONS

Yaghoobi H. "Scalable OFDMA Physical Layer in IEEE 802.16 WirelessMAN", Intel Technology Journal, US, vol. 8, No. 3, Aug. 20, 2004.
IEEE, "Draft Standard for Local and metropolitan area networks Part 16: Air Interface for Broadband Wireless Access Systems," P802.16 Rev2/D5, Jun. 2008, the whole document.

* cited by examiner

*Primary Examiner* — Mark Rinehart
*Assistant Examiner* — Angel Brockman

(57) ABSTRACT

Methods and apparatus for allocating time-frequency resources to mobile terminals in a wireless communications system in which time-frequency resources may be selectively used according to a first multiple-input multiple-output (MIMO) transmission scheme or a second MIMO transmission scheme that differs from the first MIMO transmission scheme. An exemplary method comprises, for at least a first scheduling instance, identifying a first group of mobile terminals corresponding to the first MIMO transmission scheme and a second group of mobile terminals corresponding to the second MIMO transmission scheme, allocating time-frequency resources in a first pre-determined time-frequency zone exclusively to mobile terminals belonging to the first group, and allocating time-frequency resources in one or more additional pre-determined time-frequency zones to one or more mobile terminals belonging to the second group. This method may be implemented in a base station of a WiMAX system, for example.

32 Claims, 9 Drawing Sheets

SYSTEM, METHOD, AND APPARATUS FOR IMPROVED SPACE-TIME CODING AND DYNAMIC SWITCHING WITH ADVANCED RECEIVERS

TECHNICAL FIELD

The present invention relates generally to wireless communications systems, and more particularly to techniques for allocating time-frequency resources in a wireless communications where two or more multiple-input multiple-output (MIMO) transmission schemes are used simultaneously.

BACKGROUND

The IEEE 802.16-2005 specification (IEEE Standard for Local and Metropolitan Area Networks—Part 16: Air Interface for Fixed Broadband Wireless Access Systems) specifies the air interface for a wireless communication system widely known as WiMAX. In particular, the IEEE 802.16-2005 specification defines frame structures for Time-Division Duplex (TDD) and Frequency-Division Duplex (FDD) deployments of the Orthogonal Frequency Division Multiple Access (OFDMA) physical (PHY) layer. Current developments of the standard as deployed for Mobile WiMAX are focused on TDD systems, where the carrier is divided in time between the downlink (DL) and the uplink (UL) directions.

In one possible deployment of the system as used by Mobile WiMAX, the carrier can have a bandwidth of either 5 or 10 MHz. In either case, the frame duration is five milliseconds, and is apportioned into downlink and uplink subframes that are separated by transmit-receive transition gaps (TTGs) and receive-transmit transition gaps (RTGs) to allow for switching between transmit and receive directions. The uplink and downlink subframes are in turn divided into subchannels, such that a subchannel comprises a particular number of OFDMA subcarriers (frequency resources) over a "slot" comprising two or three OFDMA symbol times (time-domain resources). The exact structure of the uplink and downlink subchannels depends on whether the time-frequency resources at issue are in a Partial-Use-of-Subcarriers (PUSC) zone, a Full-Usage of Subcarriers (FUSC) zone, or an Adaptive Modulation and Coding (AMC) zone. The IEEE 802.16-2005 standard also specifies the allocation of time-frequency elements for pilot signals, again according to the zone type.

Several transmission formats are defined for Mobile WiMAX. The selection of a particular transmission format is based on the signal processing capabilities of the base station and the mobile station, as well as the number of antennas deployed at each radio. Among these transmission formats are several multi-antenna configurations collectively known as Multi-Input Multi-Output (MIMO) modes. These MIMO modes include a space-time coding mode, using Alamouti coding, and a spatial multiplexing mode.

Mobile WiMAX allows users to effectively choose the best MIMO mode on the downlink, between Alamouti coding and spatial multiplexing, a technique called dynamic switching. The mobile station sends a channel quality indicator (CQI) report with an estimate of the signal-to-interference ratio (SINR) on the downlink channel. In addition, the mobile station may indicate a MIMO mode to use on the downlink, using an associated fast feedback channel. The base station allocates time-frequency resources on the downlink, using this information, and signals the resource allocations in a DL-MAP message transmitted near the beginning of each downlink frame.

It is well known that the rank of the transmission channel plays an important role in the number of spatially multiplexed streams that the channel can support. For an M-by-N MIMO scheme (M transmit antennas and N receive antennas), the rank can vary between 1 and the lesser of M and N. Attempting a transmission of more streams than the rank will cause degraded performance. Thus, for example, if an M-by-N MIMO channel has rank P, then the supported rate of the transmission is highest when P streams are transmitted. Rank adaptation is used in various systems, such as the Long-Term Evolution (LTE) system developed by the $3^{rd}$-Generation Partnership Project (3GPP), as a capacity enhancing measure.

WiMAX supports a 2×2 Alamouti space-time coding scheme, which represents a single-stream MIMO transmission. In addition, WiMAX supports a 2×2 spatial multiplexing mode, which represents a two-stream MIMO transmission. Thus, the dynamic switching as used in Mobile WiMAX can be viewed as emulating a form of rank adaptation. With dynamic switching, different users in the same zone may be using different MIMO transmission schemes at any given time.

SUMMARY

Disclosed herein are various methods and apparatus for allocating time-frequency resources to mobile terminals in a wireless communications system in which time-frequency resources may be selectively used according to a first multiple-input multiple-output (MIMO) transmission scheme or a second MIMO transmission scheme that differs from the first MIMO transmission scheme. Methods and apparatus for processing received data transmitted by an access point according to a MIMO scheme, such as a space-time coding scheme, are also disclosed.

In a wireless system configured according to some embodiments of the invention, bandwidth allocations corresponding to Alamouti (or other space-time coding) users are placed in a single separate zone that is different from the mandatory zone. In some embodiments, Alamouti and spatial multiplexing users are assigned to different zones. In some of these embodiments, these separate zones can be sized ahead of time, or dynamically, to accommodate the median expected concentrations of Alamouti and spatial multiplexing users. At a system level, the zones may be synchronized over a region, or system-wide, so that Alamouti users in an "all-Alamouti" zone only "see" Alamouti interferers. This limiting of the interfering signals to Alamouti-encoded signals opens up the ability to use receivers such as the Spatio-Temporal Interference Rejection Combining (STIRC) receiver in combination with the normal dynamic switching employed in WiMAX.

In some embodiments of a system according to the techniques herein, whether or not a particular zone is restricted to a certain MIMO mode, e.g., Alamouti-only, is indicated to mobile stations as part of the zone switch information element (in the DL-MAP). In these systems, the mobile station may then determine whether or not the use of a STIRC receiver (or other advanced receiver processing) is appropriate for the given interference environment. In some systems, the mobile station could announce its own capabilities to the system. For instance, a mobile station could communicate its ability to use an advanced receiver for certain types of transmissions, such as the Alamouti-IRC or STIRC receiver for Alamouti transmissions. In this way, the system scheduler can determine which mobile stations are likely to benefit the most from assignment to a particular zone, such as an Alamouti-only zone, and prioritize the scheduling of those mobile stations in the appropriate zones.

In some mobile stations adapted according to the inventive techniques disclosed herein, the mobile station determines that it has been allocated resources in a zone where it knows that all interferers are using space-time coding. With this information, the receiver can activate an advanced receiver, such as the STIRC or the Alamouti-IRC receiver, which is capable of exploiting both the time and spatial correlations of the interfering signals. Indeed, a related mobile station aspect is to use the STIRC receiver or Alamouti-IRC receiver in combination with dynamic switching. Since the mobile station in these systems knows whether or not it can be assigned to an Alamouti-only zone, the availability of the advanced receiver process, along with its improved performance, can be used as a factor in determining whether a space-time coding mode or a spatial multiplexing mode is preferred.

An exemplary method according to some of the above techniques thus comprises, for at least a first scheduling instance, identifying a first group of mobile terminals corresponding to the first MIMO transmission scheme and a second group of mobile terminals corresponding to the second MIMO transmission scheme, allocating time-frequency resources in a first pre-determined time-frequency zone exclusively to mobile terminals belonging to the first group, and allocating time-frequency resources in one or more additional pre-determined time-frequency zones to one or more mobile terminals belonging to the second group. This method may be implemented in a base station of a WiMAX system, for example. Other embodiments of the present invention thus include a wireless access point configured to carry out the preceding method, and variants thereof.

Embodiments of the present invention further include methods for processing received data transmitted by an access point according to a first MIMO transmission scheme (such as an Alamouti-coding scheme), as well as mobile terminals configured to carry out those methods. An exemplary method comprises, for at least a first scheduling instance, determining whether the mobile terminal has been allocated downlink time-frequency resources in a restricted time-frequency zone that is exclusive to downlink transmissions according to the first MIMO transmission scheme, processing signals received in the allocated downlink time-frequency resources according to a first processing mode if the allocated downlink time-frequency resources are in the restricted time-frequency zone and otherwise processing signals received in the allocated downlink time-frequency resources according to a second processing mode, wherein the second processing mode is less sensitive than the first processing mode to co-channel interfering signals transmitted according to a second MIMO transmission scheme differing from the first MIMO transmission scheme.

The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the meaning and equivalency range of the appended claims are intended to be embraced therein

Frame 9 is a process flow diagram illustrating an exemplary method for allocating time-frequency resources in a wireless system.

Figure 10:
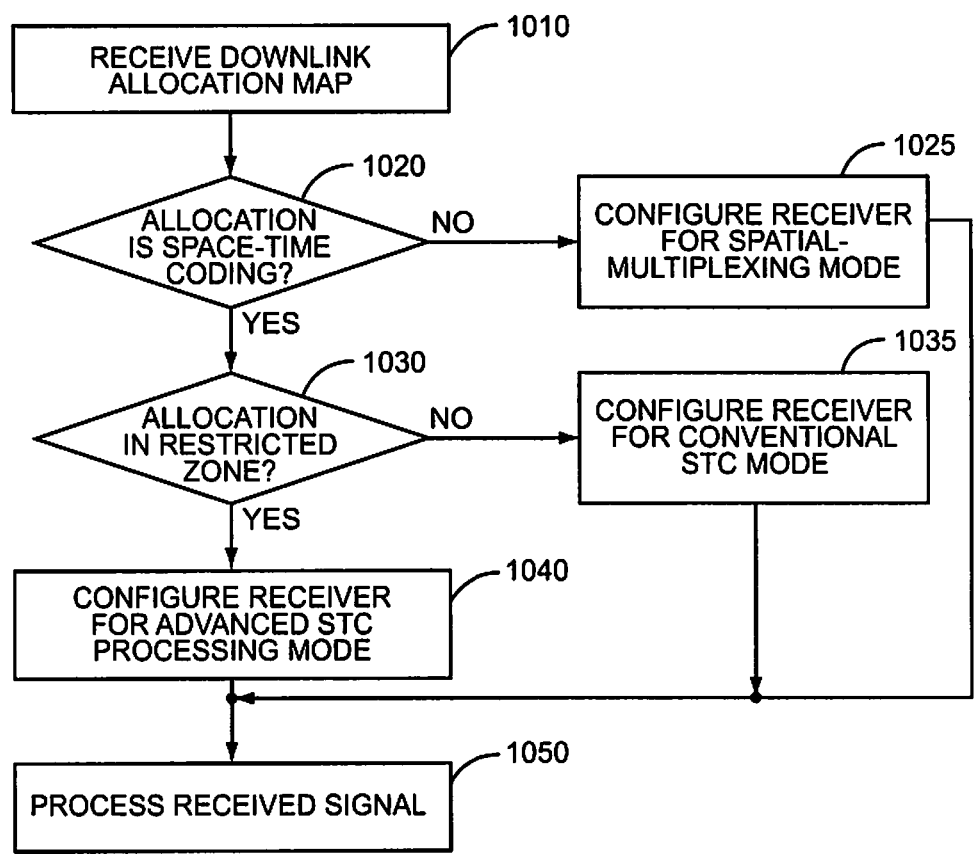

FIG. 10 is a process flow diagram illustrating an exemplary method for processing resource allocation information in a mobile terminal.

Figure 11:
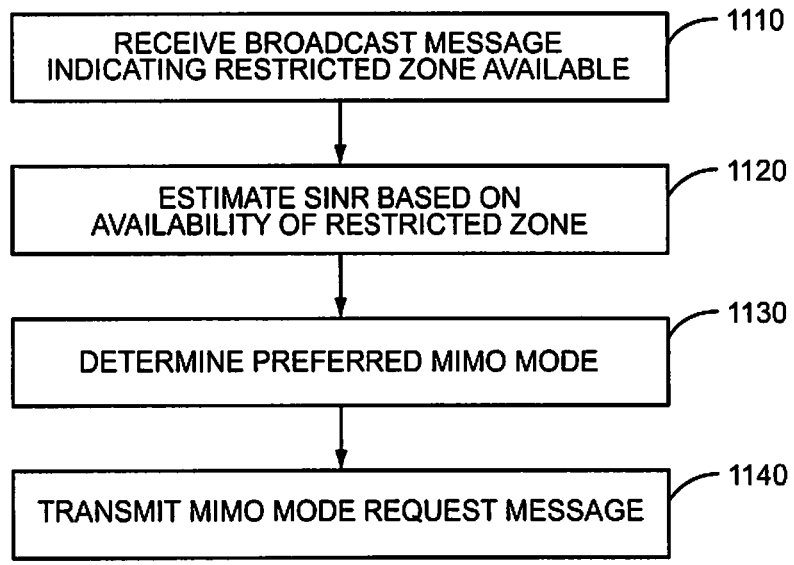

FIG. 11 is a process flow diagram illustrating a method for determining a MIMO mode.

Figure 12:
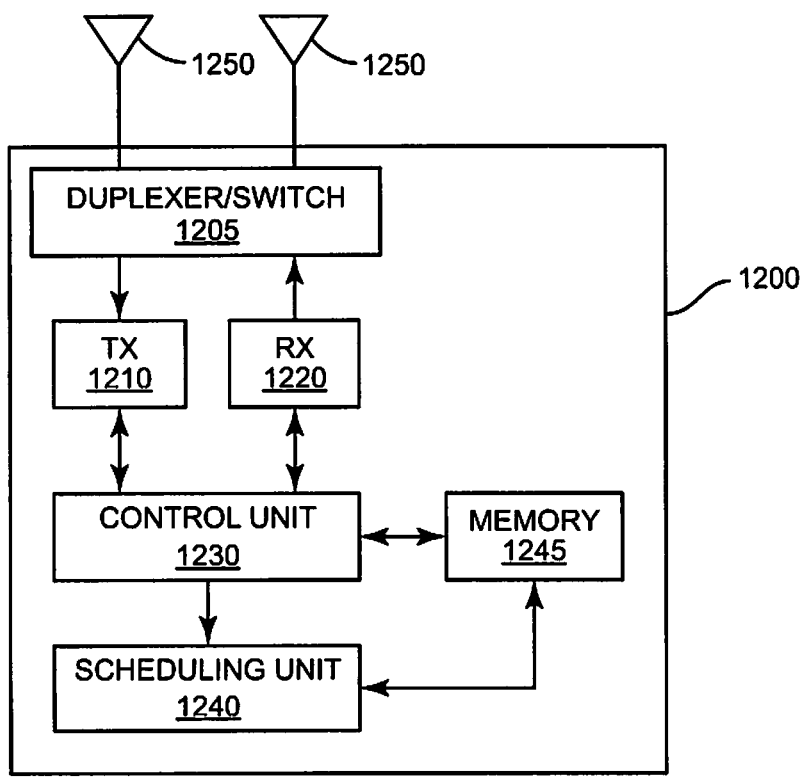

FIG. 12 is a block diagram illustrating an exemplary base station.

DETAILED DESCRIPTION

Some embodiments of the present invention pertain to the IEEE 802.16 specification for Wireless Metropolitan Area Networks (WMAN), and its derivative, labeled Mobile WiMAX, as defined by the WiMAX Forum Mobile System Profile Release 1.0, as well as to extensions to that profile as being defined in Release 1.5. The inventive techniques disclosed herein are likewise applicable to parts of the IEEE 802.16m project, which has the goals of extending the 2005 version of the IEEE 802.16 specification to wider bandwidths and higher data rates, as well as being conformant to the goals of the IMT-Advanced designation being defined in the ITU-R. Of course, those skilled in the art will appreciate that the techniques described herein are not limited to application in these particular systems, and may be applied to other wireless systems, whether already developed or yet to be planned.

Figure 1:
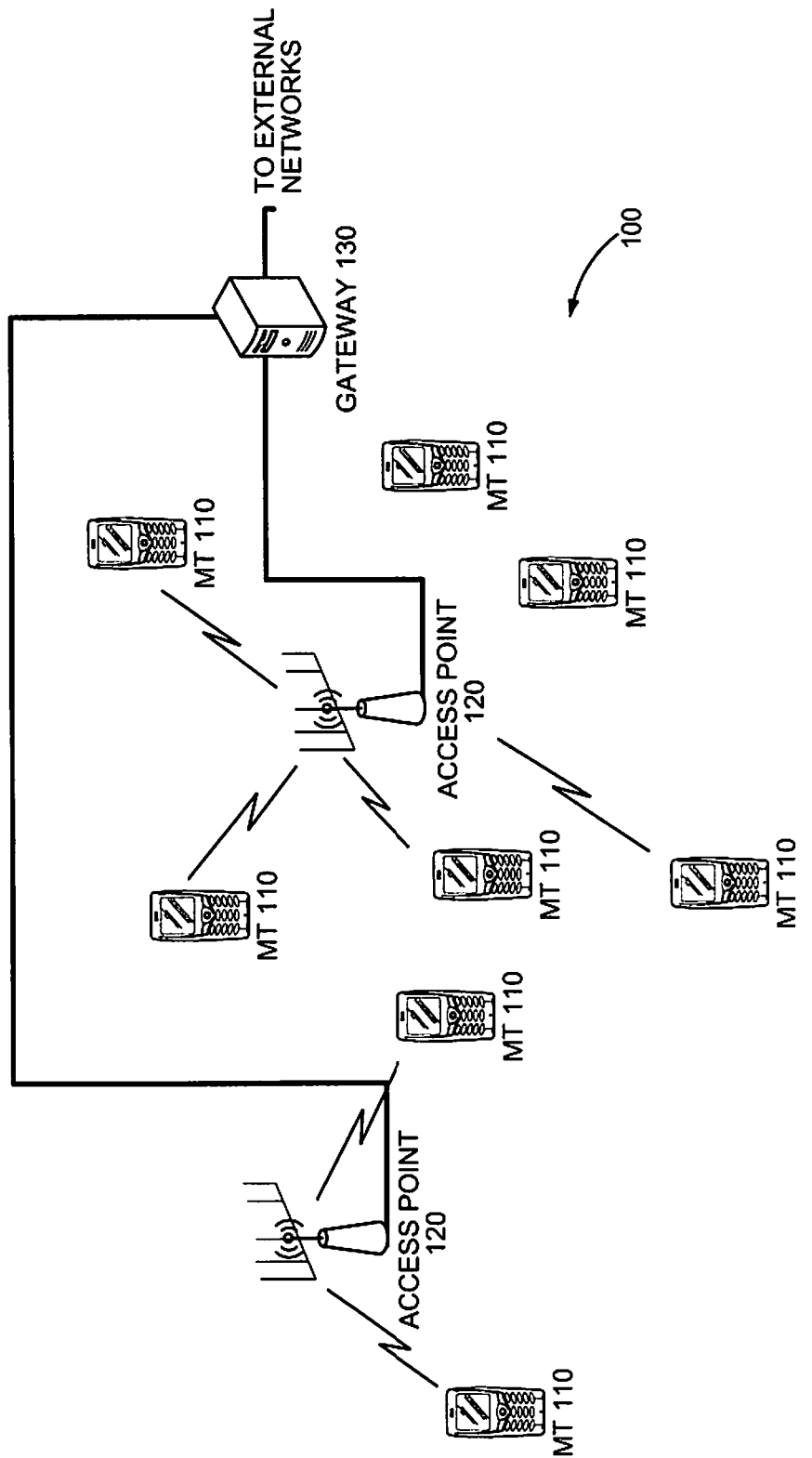
FIG. 1 illustrates an exemplary wireless communication system.

An illustrative schematic of a WiMAX network is given in FIG. 1, which depicts a number of access points 120, several mobile terminals 110, and a gateway 130, which connects the access points 120 to private and/or public data networks such as the Internet. Several aspects of the techniques described herein are concentrated in the access points 120 (which are interchangeably referred to as base stations herein) and mobile terminals 110 (which are likewise interchangeably referred to as mobile stations herein), and are reflected in the ways that the air interface is configured.

As noted above, the IEEE 802.16-2005 specification defines frame structures for Time Division Duplex (TDD) and Frequency Division Duplex (FDD) deployments of the OFDMA PHY layer, although current developments of the standard are generally focused on TDD systems. In one possible deployment of a TDD system, the carrier can have a bandwidth of 5 or 10 MHz. The frame duration is 5 ms and is apportioned into downlink and uplink subframes that are separated by a TTG and RTG gap to allow for switching between transmit and receive directions. In a PUSC zone, the 10 MHz downlink signal is divided into subchannels composed of 28 subcarriers in frequency spanning a slot of 2 OFDMA symbols. Each OFDMA symbol has 840 used subcarriers (composed of data and pilots), as well as 184 guard subcarriers. Each downlink subchannel reserves 4 of 28 subcarriers for pilot symbols. The downlink PUSC zone contains 30 subchannels.

The uplink signal in a PUSC zone is divided into subchannels of 72 subcarriers, each subchannel spanning a slot of 3 OFDMA symbols. In each uplink subchannel, 24 of the 72 subcarriers are reserved for pilots. The uplink PUSC zone contains 35 subchannels. Each transmission unit spans a single subchannel spanning 3 OFDMA symbols.

Each subcarrier spans 10.938 kHz, implying a symbol duration of 102.86 microseconds. This includes a guard time of ⅛ of a useful symbol duration. The 5-millisecond frame time then includes 48.61 symbols, of which 1.61 symbols are divided between the transmit time gap (TTG) and the receive time gap (RTG). These are used allow the system to switch between downlink and uplink transmissions when TDD is used.

The IEEE 802.16-2005 specification defines the use of a frame structure for a TDD signal that is divided into two subframes, to be respectively used for the downlink between the base station and the mobile station, and the uplink between the mobile station and the base station. The frame duration is divided into downlink and uplink subframes that may be configured in a variety of DL-to-UL symbol ratios, such as 35:12, 32:15, 29:18, etc.

Figure 2:
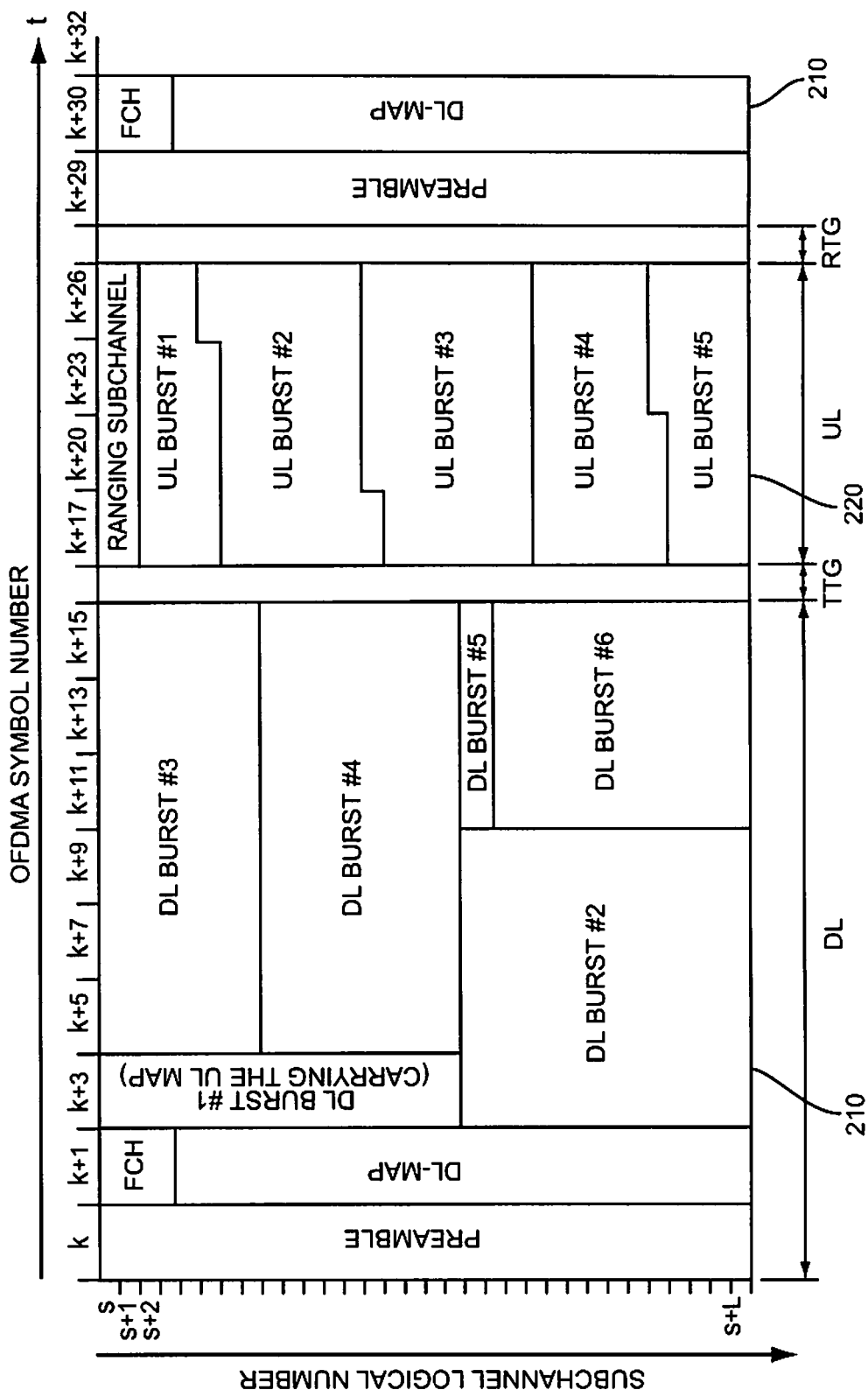
FIG. 2 illustrates the TDD frame structure for a WiMAX system.

An exemplary TDD frame structure is illustrated in FIG. 2, including a DL subframe 210, an uplink subframe 220, and a portion of another downlink subframe 210. Although the subchannel formats vary from one zone type to another, they are generally numbered logically from top to bottom, as shown in FIG. 2. Each downlink subframe 210 begins with a preamble, followed by a DL-MAP, which contains downlink assignments for mobile terminals. The first DL burst following the DL-MAP includes an uplink map. In the pictured downlink subframe, only a single mandatory zone is shown.

The particular deployment of WiMAX used is generally irrelevant to the inventive techniques disclosed herein. Those skilled in the art will appreciate that these techniques may be applied to a variety of deployments of WiMAX, as well as to similar systems.

An OFDMA subframe may include multiple zones (such as PUSC, FUSC, PUSC with all subchannels, optional FUSC, AMC, TUSC1, and TUSC2). Time-frequency resources are mapped to subchannels in different ways in each of these zone types. The Partial Usage of Subcarriers (PUSC) zone uses a distributed permutation of subcarriers into subchannels, as generally described above, while the band Adaptive Modulation and Coding (AMC) zone is made up of subchannels with subcarriers that are adjacent in frequency and further grouped into bands. A subchannel in a Band AMC zone is composed of 48 data subcarriers and 6 pilot subcarriers spread over 3 symbols. The 10 MHz carrier consisting of 864 used subcarriers and 160 guard subcarriers in a single OFDMA symbol is divided into 48 subchannels. The subchannel definition is identical for the downlink and uplink directions in a band AMC zone. Other zone definitions are also possible, such as the Adaptive Antenna System (AAS) zone. Although these zones are not all discussed in detail herein, the inventive techniques disclosed herein are applicable to zones of any type.

Figure 3:
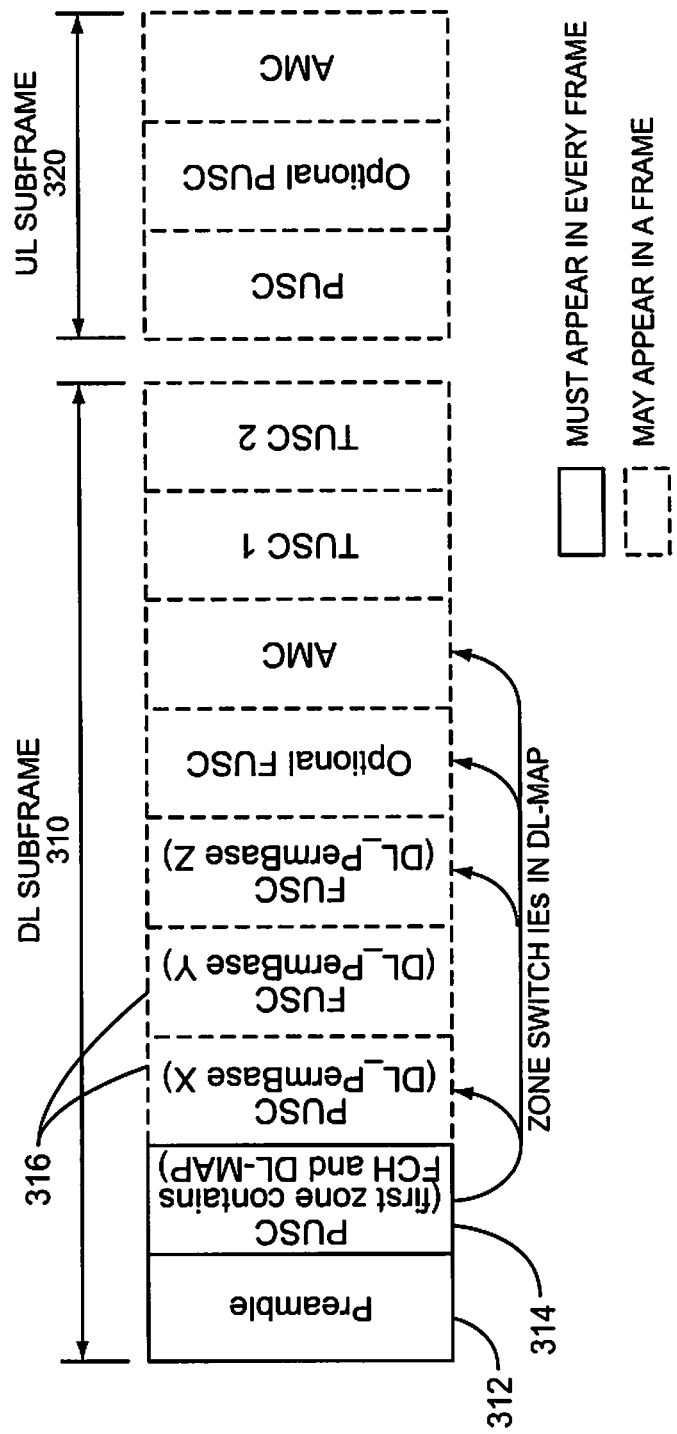
FIG. 3 illustrates the use of zones and zone switches in a downlink subframe.

The preamble and control signals are part of a mandatory PUSC zone—thus every downlink subframe begins with a PUSC zone. Another exemplary frame structure is illustrated in FIG. 3, which pictures a downlink subframe 310 and uplink subframe 320. In the downlink subframe 310, a preamble 312 is followed by a PUSC zone that includes a Frame Control Header (FCH) and the DL-MAP. This PUSC zone may be followed by one or more additional zones 316 of various types; the beginning of each zone is indicated by so-called zone switch information elements in the DL-MAP. As explained above, the preamble and initial PUSC zone must appear in every frame, while the use of subsequent zones is optional.

Several transmission formats are defined for Mobile WiMAX; these transmission formats are selectively applied based on the signal processing capabilities of the base station and the mobile station, as well as on the number of antennas deployed at each radio. Among these transmission formats are included several multi-antenna configurations collectively known as Multi-Input Multi-Output (MIMO) modes. Generally, modulation symbols are transformed to generate the transmitted signal S, and the received signal R may be expressed as:

$$R = HS + n \quad (1)$$

where H is the propagation channel response and n models received noise. In a MIMO mode, each of these terms is a vector or matrix quantity, as explained in more detail below.

In the case of spatial multiplexing with a 2×2 antenna system, the transmitted signal S of Equation (1) includes two different symbols $s_0$ and $s_1$. In this case, Equation (1) can be expanded as follows:

$$\begin{bmatrix} r_0 \\ r_1 \end{bmatrix} = \begin{bmatrix} h_{00} & h_{10} \\ h_{01} & h_{11} \end{bmatrix} \begin{bmatrix} s_0 \\ s_1 \end{bmatrix} + n. \quad (2)$$

Figure 4:
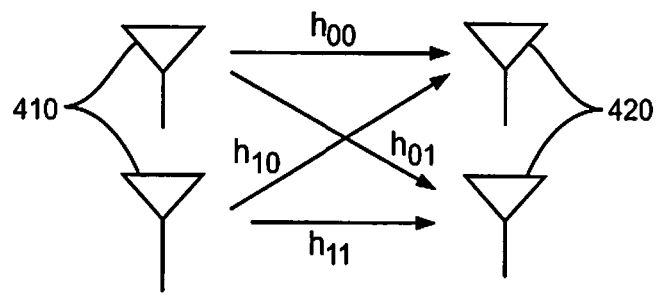
FIG. 4 illustrates the channel paths in a 2-by-2 MIMO channel.

This equation is easily extended to more antennas. The channel response matrix H includes complex channel coefficients for each of the antenna-to-antenna propagation paths, as shown in FIG. 4, where each of the transmit antennas 410 transmits signals that are received by each of the receive antennas 420.

The symbols being spatially multiplexed can be generated from a single coded block or from two separate coded blocks, each coded block feeding one transmit antenna. These two methods of spatial multiplexing are called vertical and horizontal coding respectively.

Another MIMO mode may be generally referred to as space-time coding. When Alamouti coding is used in a 2×2 space-time coding system, the received signal satisfies the following expression:

$$\begin{bmatrix} r_{00} & r_{01} \\ r_{10} & r_{11} \end{bmatrix} = \begin{bmatrix} h_{00} & h_{10} \\ h_{01} & h_{11} \end{bmatrix} \begin{bmatrix} s_0 & s_1 \\ -s_1^* & s_0^* \end{bmatrix} + n, \quad (3)$$

where $s_0$ and $s_1$ are the symbols transmitted over two OFDM symbols, and where $s_i^*$ denotes complex conjugation. The Alamouti-coded signal can be represented as a linear dispersive code by separating out the real and imaginary components of the signals thus:

$$S_k = \sum_{m=0}^{M-1} (A_m x_{k,m} + j B_m y_{k,m}), \quad (4)$$

where M=2 is the number of symbol periods over which the dispersive code operates, and $x_{k,m} + j y_{k,m}$, m=1, 2, are the symbols being transmitted to user k over one subcarrier in two OFDMA symbols using two transmit antennas. This leads to the received signal $$r_0 = \sum_{k=0}^{K-1} G_k z_k + \tilde{n} \quad (5)$$

where the relations $$G_k = \begin{bmatrix} \Re(I \otimes H_k) & \Im(I \otimes H_k) \\ \Im(I \otimes H_k) & \Re(I \otimes H_k) \end{bmatrix} C \quad (6)$$

and $$r = \begin{bmatrix} vec(\Re(R)) \\ vec(\Im(R)) \end{bmatrix} \quad (7)$$

$$\tilde{n} = \begin{bmatrix} vec(\Re(n)) \\ vec(\Im(n)) \end{bmatrix}$$

$$z_k = \begin{bmatrix} x_{k,1} \\ M \\ x_{k,M} \\ y_{k,1} \\ M \\ y_{k,M} \end{bmatrix}$$

$$A_1 = \begin{bmatrix} +1 & 0 \\ 0 & +1 \end{bmatrix} \quad B_1 = \begin{bmatrix} +1 & 0 \\ 0 & -1 \end{bmatrix}$$

$$A_2 = \begin{bmatrix} 0 & -1 \\ +1 & 0 \end{bmatrix} \quad B_2 = \begin{bmatrix} 0 & 1 \\ +1 & 0 \end{bmatrix}$$

hold. The symbol $\otimes$ denotes the Kronecker product of two matrices and the symbols $\Re$ and $\Im$ denote the real and imaginary parts of a complex number respectively. The matrix C is related to A and B as:

$$C = [a_0 L \; a_{M-1} \; b_0 \; L \; b_{M-1}], \quad (8)$$

with $$a_m = \begin{bmatrix} vec(\Re(A_m)) \\ vec(\Im(A_m)) \end{bmatrix} \quad (9)$$

$$b_m = \begin{bmatrix} vec(\Re(B_m)) \\ vec(\Im(B_m)) \end{bmatrix},$$

where the vec(.) operator rearranges the columns of the matrix as a single vector.

The index k in Equation (4) represents the k-th user in a cellular system. If the index k=0 in Equation (4) denotes the desired signal and all other k's represent interferers, then the received signal and interference satisfies:

$$r_0 = G_0 z_0 + I + \tilde{n}$$

$$I + \tilde{n} = \Sigma G_k z_k + \tilde{n} \quad (10)$$

when all interferers also use space-time coding.

As noted earlier, Mobile WiMAX allows users to choose the best MIMO mode on the downlink, e.g., between Alamouti space-time coding and spatial multiplexing. The mobile station sends a channel quality indicator (CQI) report with an estimate of the SINR on the channel. In addition, the mobile station may indicate a MIMO mode to use on the downlink in an associated fast feedback channel. The base station assigns bandwidth in the DL-MAP message using this information.

It is well known that the rank of the transmission channel plays an important role in the number of streams that the channel can support. For an M×N MIMO scheme (M transmit antennas by N receive antennas), the rank can vary from 1 to the smaller of M and N. Attempting a transmission of more streams than the rank will cause a degradation in performance; i.e., if a M×N MIMO channel has rank P, then the supported rate of the M×N MIMO transmission is highest when P streams are transmitted. Generally, channels with higher SINR are better able to support multi-stream transmission. Rank adaptation is used in systems such as LTE as a capacity enhancing measure.

It should be noted that the 2×2 Alamouti scheme represents a single stream transmission, while the 2×2 SM mode represents a 2 stream transmission. Thus, dynamic switching as used in Mobile WiMAX is capable of emulating a form of rank adaptation. Dynamic switching is expected to be used among users in the same zone, although the specification does allow for the allocated bandwidth to be in a different zone.

For both MIMO modes described, there are several receiver implementations that are possible. One approach for processing received signals in a 2×2 MIMO system is to use MMSE or the Interference Rejection Combining (IRC) receiver, which uses a linear combination of the received symbols from each antenna to estimate the transmitted symbols $s_0$ and $s_1$. In the spatial multiplexing case, an estimate $S_0$ of a transmitted symbol $S_0 = [s_0 s_1]^T$ is given by:

$$\hat{S}_0 = W_0^T R_0 = H_0^T Q_{ii}^{-1} R_0 \quad (11)$$

Correspondingly, the transmitted symbols are estimated using $$\hat{z}_0 = W_0^T r_0 = G_0^T Q_{ii}^{-1} r_0 \quad (12)$$

for Alamouti coding, where $z_0$ is defined in Equation (7). The noise and interference covariance matrix Q is most generally defined as:

$$Q_{ii} = E\{(I+n)(I+n)^\dagger\} \quad (13)$$

where the dagger ($\dagger$) represents the complex conjugate transpose (or Hermitian transpose) of a matrix. In general, when nothing is known about the specific MIMO mode that the interferers are using, the general formulation above is used to determine the noise covariance matrix. Consequently, when users using a mixture of spatial multiplexing and space-time codes interfere with each other, no assumptions can be made about spatial or temporal correlation between antennas and symbol periods respectively.

In G. Klang and B. Ottersten, "Space-time interference rejection cancellation in transmit diversity," in Proceedings, Wireless Personal Multimedia Commun., vol. 2, pp 706-710, December 2002, Kiang and Ottersen describe several formulations for the interference covariance for space-time coding, under the assumption that all users use like transmission. Three receiver algorithms are considered. First is Maximal Ratio Combining. Second is an Interference Rejection Combining (IRC) process, but where the spatial correlation between the receive antennas is modeled using the knowledge that the interfering users only use Alamouti transmission, and the specialized structure of the G matrices of the interferer in Equation (6) are exploited. In the discussion that follows, this receiver process is referred to as Alamouti-IRC. A third process, spatio-temporal IRC (STIRC), exploits spatial and temporal correlation to force the interference covariance into a specialized structure for the matrices G as in Equation (6).

For the purposes of the discussion that follows, a receiver that uses the most general formulation of Equation (13) will be referred to as the conventional IRC receiver. In this receiver, no knowledge of spatial or temporal correlation properties is assumed.

Spatially multiplexed signals, on the other hand, can be received using the IRC receiver model formulated in Equation (11). Apart from the IRC receiver, vertically encoded SM can also be received using maximum-likelihood detection (MLD), where the desired signal is estimated as:

$$\hat{s} = \underset{s}{\operatorname{argmin}} \|R - Hs\|. \tag{14}$$

Alternatively, horizontally encoded spatially multiplexed signals can be received using a Successive Interference Cancellation (SIC) receiver—such a receiver is capable of achieving the open loop capacity of the channel. The SIC receiver estimates the codeword having higher SINR, under the assumption that the second stream is colored noise, and then subtracts the effect of that codeword from the received signal after re-encoding from the received signal. The second stream may then be decoded from the residual.

A comparison of the performance of the IRC receiver to the Alamouti-IRC and the STIRC receivers for processing Alamouti-encoded signals indicates that the STIRC yields the highest SINR for a given signal environment, followed by the Alamouti-IRC receiver, and then the conventional IRC receiver. Of course, a higher SINR indicates better performance since the SINR can be uniformly translated to a supported data rate that increases with larger SINR. This improved performance for the STIRC receiver is intuitively expected, given the more complex receiver formulation that is able to exploit both time and spatial aspects of the signal's structure in the formulation of the interference covariance matrix.

Similar effects are observed with spectral efficiency calculations pertaining to more advanced receivers for vertically coded spatial multiplexing (e.g., the maximum-likelihood demodulation receiver) and horizontally coded spatial multiplexing (e.g., the successive interference canceling receiver) that are used as part of the dynamic switching strategy. The spectral efficiency of the receiver that is capable of using STIRC for Alamouti coding is higher than the spectral efficiency of the receiver that uses a conventional IRC receiver process.

One problem with dynamic switching within the state of the art in Mobile WiMAX is that it is expected to be implemented with Alamouti and spatial multiplexing users mixed within the same zone. Given that interfering signals of both types are present, the conventional IRC receiver for Alamouti must be used. For example, the STIRC receiver cannot be used since the mobile station has no knowledge of the spatial transmission scheme used on those time-frequency resources utilized by an interfering base station. This requirement to use the conventional IRC receiver results in degraded performance compared to the case where the interferers use only Alamouti transmissions, and the STIRC receiver can be used.

One solution to this problem is to put all bandwidth allocations corresponding to Alamouti users in a single separate zone that is different from the mandatory zone. In some embodiments, Alamouti and spatial multiplexing users are assigned to different zones. In some of these embodiments, these separate zones can be sized ahead of time, or dynamically, to accommodate the median expected concentrations of Alamouti and spatial multiplexing users. At a system level, the zones may be synchronized over a region, or system-wide, so that Alamouti users in an "all-Alamouti" zone only "see" Alamouti interferers. This limiting of the interfering signals to Alamouti-encoded signals opens up the ability to use receivers such as the STIRC in combination with the normal dynamic switching of WiMAX.

In some embodiments of a system according to the techniques herein, whether or not a particular zone is restricted to a certain MIMO mode, e.g., Alamouti-only, is indicated to mobile stations as part of the zone switch information element (in the OL-MAP). In these systems, the mobile station may then determine whether or not the use of a STIRC receiver (or other advanced receiver processing) is appropriate for the given interference environment. In some systems, the mobile station could announce its own capabilities to the system. For instance, a mobile station could communicate its ability to use an advanced receiver for certain types of transmissions, such as the Alamouti-IRC or STIRC receiver for Alamouti transmissions. In this way, the system scheduler can determine which mobile stations are likely to benefit the most from assignment to a particular zone, such as an Alamouti-only zone, and prioritize the scheduling of those mobile stations in the appropriate zones.

In some mobile stations adapted according to the inventive techniques disclosed herein, the mobile station determines that it has been allocated resources in a zone where it knows that all interferers are using space-time coding. With this information, the receiver can activate an advanced receiver, such as the STIRC or the Alamouti-IRC receiver, which is capable of exploiting both the time and spatial correlations of the interfering signals. Indeed, a related mobile station aspect is to use the STIRC receiver or Alamouti-IRC receiver in combination with dynamic switching. Since the mobile station in these systems knows whether or not it can be assigned to an Alamouti-only zone, the availability of the advanced receiver process, along with its improved performance, can be used as a factor in determining whether a space-time coding mode or a spatial multiplexing mode is preferred.

Figure 7:
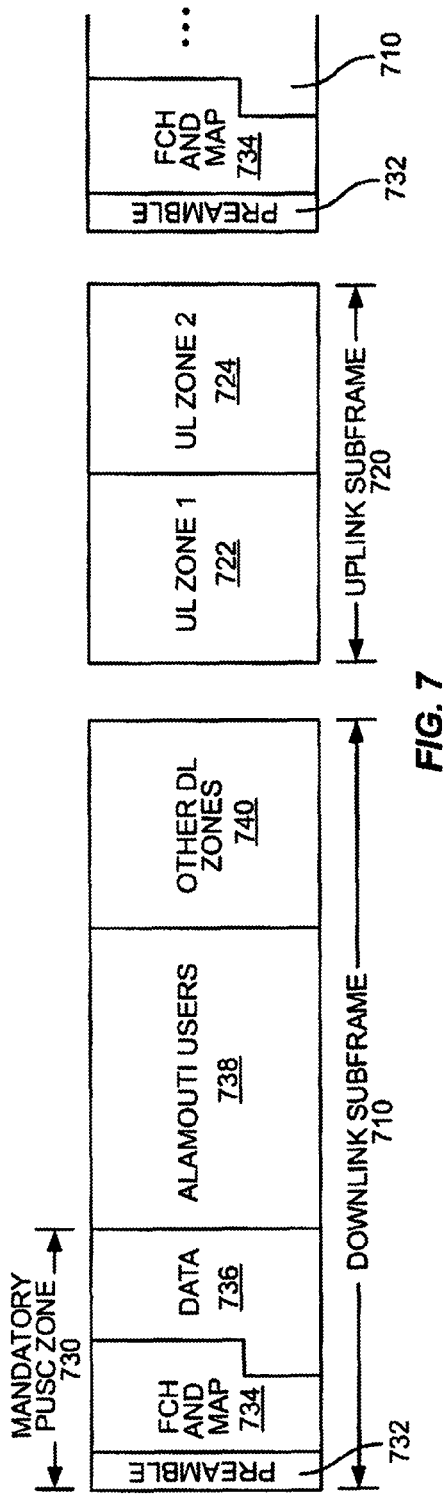
FIG. 7 illustrates an exemplary mapping of MIMO users to zones in a WiMAX frame.

The inventive techniques disclosed herein are reflected in the make-up of the WiMAX air interface, and in particular in the frame structure used by a system configured according to various embodiments of the present invention. Accordingly, a frame structure according to some embodiments of the invention includes a single zone that is used only for space-time coding users. An example of such a frame structure is shown in FIG. 7, in which the downlink subframe comprises a mandatory PUSC zone, which in turn comprises a preamble 732, FCH and MAP region 734, and data region 736, as well as an Alamouti-only zone 738. The Alamouti-only zone 738 is followed by other downlink zones 740. After the RTG interval, an uplink subframe 720 includes uplink zones 722 and 724.

The designation of a particular zone as an Alamouti-only zone (or, more generally, a space-time-code-only zone) is not limited to a PUSC zone; a band AMC zone might also be designated an Alamouti-only zone. Spatial multiplexing users may be allocated bandwidth in the data portion of the mandatory PUSC zone, or in other DL zones, and dynamic switching may be employed so that a given mobile is sometimes assigned to an Alamouti-only zone, for receiving Alamouti-coded signals, and assigned to another zone at other times, for processing spatially multiplexed signals. Those skilled in the art will also note that a generic communication system capable of applying these techniques to the uplink can easily be envisaged.

Figure 8:
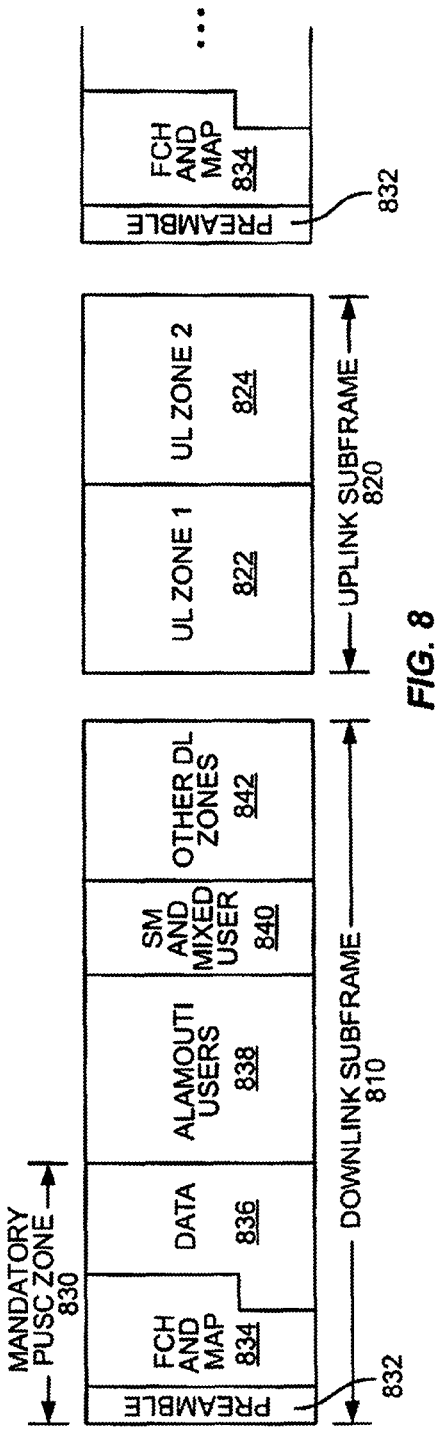
FIG. 8 illustrates another exemplary mapping of MIMO users to zones in a WiMAX frame.

An exemplary frame structure according to other embodiments of the present invention is illustrated in FIG. 8. In systems using this frame structure, dynamic switching between the Alamouti-only zone and other zones is employed. Thus, downlink subframe 810 comprises a mandatory PUSC zone (with preamble 832, FCH and MAP region 843, and data region 836), an Alamouti-only zone 838, an additional MIMO zone 840 allocated to spatial multiplexing users and other users (labeled "SM and mixed user"), and one or more other zones. Following the downlink subframe 810 is an uplink subframe 820 similar to that pictured in FIG. 7, with uplink zones 822 and 824. In systems using this frame structure, Alamouti users assigned to the Alamouti-only zone 838 would be able to use the Alamouti-IRC or the Alamouti-STIRC receivers (as well as any other receivers such as the Alamouti-MRC receiver), to fully exploit the fact that the spatial and time correlation properties of interfering signals are known.

While FIGS. 7 and 8 illustrate two exemplary frame structures for a TDD WiMAX system, those skilled in the art will appreciate that other frame structures are possible, and that variations of these techniques may be employed in FDD WiMAX systems or other systems employing two or more dynamically selectable MIMO modes.

Any of the frame structures described above could be deployed for Mobile WiMAX in such a way that the mobile station autonomously reads the resource allocation information elements in the DL-MAP message for a particular zone, and guesses that the interference is likely to be only from Alamouti-encoded signals. This approach implies a tacit agreement among vendors and operators to define zones uniformly and synchronously across base stations.

Alternatively, a formal protocol for defining Alamouti-only zones may be written into a future version of the standard. In one approach, associated with this protocol would be a broadcast message sent by the system as part of the network capabilities announcement. This message would indicate that the system implements an "Enhanced STC zone," an "Enhanced Dynamic Switching zone," or the like. This message could be added to the Downlink Channel Descriptor (DCD), which is sent periodically by the base station and provides definitions of the DIUC mappings and other system specific information.

Some embodiments of a mobile station according to the present invention may include more than one receiver process implementation, in which case the mobile station can choose to use either the Alamouti-STIRC receiver or a conventional IRC receiver for Alamouti signals, or an MLD or IRC receiver for vertically encoded spatial multiplexing signals. These or other receivers might also choose between a conventional IRC receiver or a SIC receiver for horizontally encoded spatially multiplexed signals.

Figure 5:
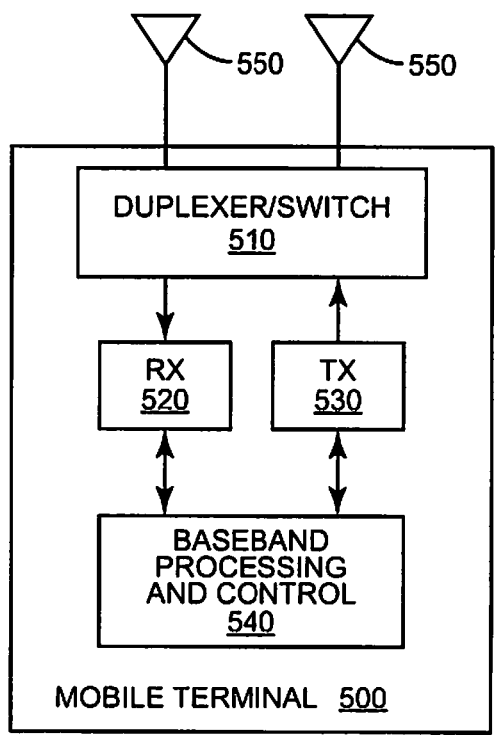
FIG. 5 is a block diagram illustrating an exemplary mobile terminal.

An exemplary mobile terminal 500 according to some embodiments of the invention is shown in FIG. 5. Mobile terminal 500 is equipped with two (or more) antennas 550, enabling the receiver to process spatially multiplexed signals (e.g. 2×2) as well as Alamouti-coded signals. Mobile terminal 500 includes a conventional duplexer/switch 510 (a frequency duplexer is used in systems using frequency-division duplexing; a switch used for time-division duplexing systems), receiver front-end circuits 520, and transmitter circuit 530. The details of these mostly analog circuits are well known to those skilled in the art, and these details are unnecessary to a full understanding of the present invention.

Figure 6:
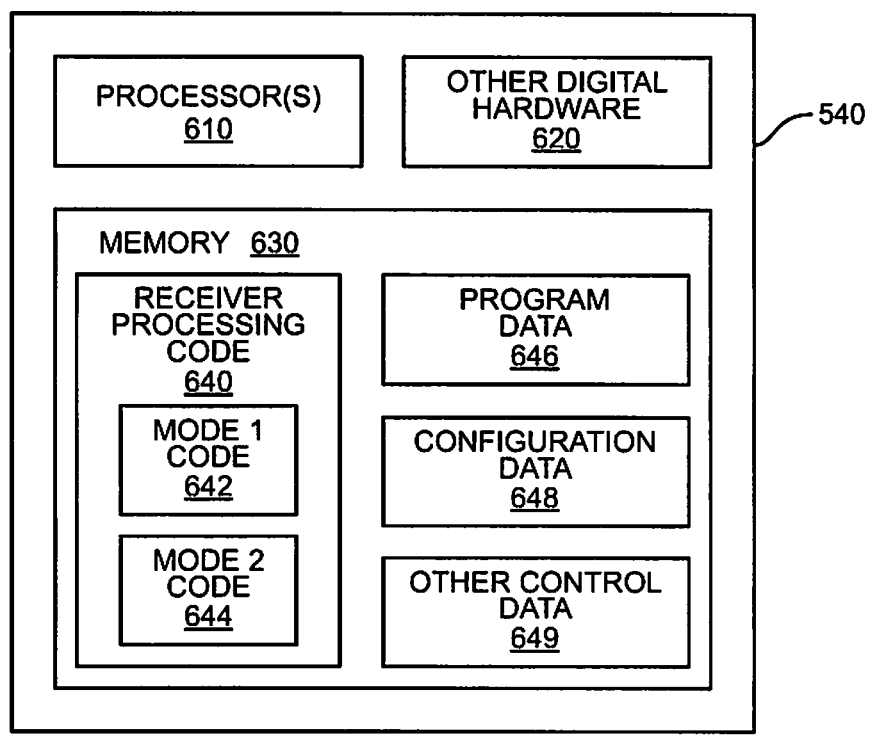
FIG. 6 illustrates details of an exemplary processing circuit according to some embodiments of the invention.

Receiver processing (as well as transmitted signal generation and other control processing) is performed in baseband processing and control circuit 540. Those skilled in the art will appreciate that this processing circuit may comprise one or several microprocessors, digital signal processors, and the like, as well as custom hardware, configured with appropriate software and/or firmware to carry out one or more communications protocols such as WiMAX. Accordingly, an exemplary baseband and control processing circuit 540 is illustrated in FIG. 6, and includes one or more processors 610 and other digital hardware 620. One or more of these processors 610, as well as the other digital hardware 620, may be included in a single application-specific integrated circuit (ASIC), or several processors 610 and various digital hardware 620 may be distributed among several separate components, whether individually packaged or assembled into a system-on-a-chip (SoC).

In any case, the baseband and control processing circuit 540 further includes memory 630 (which may also be implemented, in full or in part, on a single ASIC, along with the processors 610 and other hardware 620, or with separate components), configured with program code for execution by processors 610. In particular, memory 630 (which may include various types such as Flash, read-only memory (ROM), optical storage, magnetic storage, etc.) includes receiver processing code 640, which may include mode-specific code modules 642 and 644. In an exemplary embodiment, mode 1 code 642 corresponds to program code for a conventional IRC processing mode, while mode 2 code 644 comprises program code for STIRC processing. Of course, other receiver modes may be available instead of or in addition to these two. Memory 630 further includes program data 646 (which may be stored, for example, in random-access memory), configuration data 648 for the receiver processing code 640 and other processing modules, and other control data 649.

FIG. 10 illustrates an exemplary procedure for a mobile station, such as mobile terminal 500, to receive and process space-time coded transmissions. This procedure is generally applicable to a wireless mobile terminal that includes a receiver circuit configured to selectively operate in either a first or second processing mode for processing received data transmitted by an access point according to a first MIMO transmission scheme, wherein the second processing mode is less sensitive than the first processing mode to co-channel interfering signals transmitted according to a second MIMO transmission scheme (that differs from the first). Thus, for example, the method illustrated in FIG. 10 may be implemented in a mobile terminal that is capable of processing Alamouti-encoded signals with either a STIRC processing mode or a conventional IRC processing mode.

In the pictured process, the mobile station is not explicitly told by the base station that Alamouti users and spatial multiplexing users are being segregated into separate zones. Thus, in some embodiments, the mobile station deduces that a restricted zone (e.g., and Alamouti-only zone) is available, based on the allocation information contained in the DL-MAP message in the current version of the Mobile WiMAX system. This may be according to a tacit agreement that certain zone configurations are restricted, or may be based on a standardized format for restricted zones.

In any case, the process of FIG. 10 begins at block 1010 with the receiving of a downlink allocation map, which assigns the mobile terminal to demodulate signals in particular time-frequency resources in a particular zone in the downlink subframe. As shown at block 1020, the mobile terminal determines whether the allocation corresponds to a space-time coded downlink signal. (This allocation may have been made based on feedback from the mobile terminal, and/or based on a specific request for a particular MIMO mode.) If not, e.g., if the allocation is for a spatially multiplexed transmission, then the mobile terminal selects a receiver processing mode configured for demodulating spatially multiplexed signals, such as an IRC receiver. The signal in the allocated downlink time-frequency resources is then processed, as shown at block 1050.

If the downlink allocation is for space-time coded signals, however, then the mobile terminal next determines whether the allocation is in a restricted zone, as shown at block 1030. If not, or if the mobile terminal is unable to tell, then the receiver is configured according to a conventional space-time coding receiver process, as shown at block 1035, such that interfering signals are not assumed to be space-time coded. If the downlink allocation is for a restricted zone (e.g., an Alamouti-only zone), then the receiver is configured instead for an advanced space-time coding processing mode, as indicated at block 1040. In either case, processing of the received signal proceeds, with the selected receiver mode, as shown at block 1050.

As noted above, a mobile terminal may be configured to factor in the availability of a restricted space-time coding zone into the selection of a preferred MIMO transmission scheme. An exemplary method according to this approach is illustrated in FIG. 11, which begins, as shown at block 1110, with the reception of a broadcast message from the serving base station indicating that a restricted zone (i.e., a zone exclusive dedicated to transmissions according to a space-time coding scheme) is available. Given that this restricted zone is available, the mobile terminal is then able to estimate the expected SINR (or other performance metric) for each of two or more receiver processing modes (e.g., STIRC, for processing Alamouti-only zone signals, or MLD, for processing vertically encoded spatially multiplexed signals), as shown at block 1120. Given this expected performance, which will depend on the prevailing channel conditions as well as on the availability of the restricted zone, a preferred MIMO mode is selected, as shown at block 1130. A message may then be transmitted to the base station, as shown at block 1140, requesting the preferred MIMO mode.

The procedure illustrated in FIG. 11 differs from that of FIG. 10 in that the separation of Alamouti and SM users is explicitly signaled to the mobile station by the base station. In some embodiments, the system includes a storage element in a network node, such as at the base station, that stores a configurable duration of the mandatory PUSC zone, the Alamouti or space-time coding zone, and other zone durations. In these embodiments, the base station may be configured to broadcast a system capabilities message that indicates either enhanced Alamouti operation or enhanced dynamic switching operation, and optionally identifies the fraction of bandwidth in the downlink subframe that is correspondingly allocated.

In some systems, one or more mobile stations may be configured to announce its capabilities to the network during registration and/or on a periodic basis. One optional feature of the design would allow the mobile stations to announce their ability to use enhanced Alamouti receivers (implying a receiver like Alamouti-STIRC)—this would give the base station scheduler information about whether that particular mobile station should be scheduled in the Alamouti-only zone or in another zone when using Alamouti transmissions. Those skilled in the art will appreciate that the base station may be configured to schedule a mobile station allocated bandwidth using Alamouti transmission in any zone, if that is the only zone in which bandwidth is available. However, those mobile stations that indicate an ability to use enhanced receiver processing may be prioritized for assignment to the restricted space-time-coding-only zone. Of course, those mobile stations not using Alamouti transmissions during a particular scheduling interval are not scheduled in a zone set aside exclusively for Alamouti users.

Thus, broadly speaking, mobile terminal implemented methods according to various embodiments include methods for processing received data transmitted by an access point according to a first multiple-input multiple-output (MIMO) transmission scheme, in which the method comprises, for at least a first scheduling instance, determining whether the mobile terminal has been allocated downlink time-frequency resources in a restricted time-frequency zone that is exclusive to downlink transmissions according to the first MIMO transmission scheme, and processing signals received in the allocated downlink time-frequency resources according to a first processing mode if the allocated downlink time-frequency resources are in the restricted time-frequency zone and otherwise processing signals received in the allocated downlink time-frequency resources according to a second processing mode, wherein the second processing mode is less sensitive than the first processing mode to co-channel interfering signals transmitted according to a second MIMO transmission scheme differing from the first MIMO transmission scheme.

In some embodiments, the first MIMO transmission scheme comprises a space-time coding transmission scheme and the second MIMO transmission scheme comprises a spatial multiplexing transmission scheme. In some of these embodiments, the first processing mode comprises a spatio-temporal interference rejection combining (IRC) receiver mode, in which spatial and temporal properties of interfering signals are used to characterize interference to the desired signals received in the allocated downlink time-frequency resources, and the second processing mode comprises a receiver mode in which temporal properties of interfering signals are not used to characterize the interference.

In some embodiments, determining whether the mobile terminal has been allocated downlink time-frequency resources in the restricted time-frequency zone comprises detecting an assigned time-frequency zone from a downlink allocation map transmitted by the access point, and comparing the assigned time-frequency zone to a pre-configured zone identifier corresponding to the restricted time-frequency zone and stored in memory of the mobile terminal. In this way, the mobile terminal can conclude that a particular zone is a restricted zone according to a tacit agreement that certain zone configurations will indicate a restricted zone, or according to a standardized configuration for restricted zone allocations. In other embodiments, determining whether the mobile terminal has been allocated downlink time-frequency resources in the restricted time-frequency zone may instead comprise receiving a control message transmitted by the access point, the control message comprising an identifier for the restricted time-frequency zone, detecting an assigned time-frequency zone from a downlink allocation map transmitted by the access point, comparing the assigned time-frequency zone to the identifier for the restricted time-frequency zone. Thus, a broadcast message might indicate the presence of a restricted zone, and the mobile terminal simply checks to see whether its allocation is within that zone.

In these and other embodiments, the mobile terminal-implemented method may include transmitting a terminal capability message to the access point, the terminal capability message indicating that the mobile terminal is capable of selecting between two or more receiver modes for processing transmissions according to the first MIMO transmission scheme. Some embodiments may comprise selecting a preferred MIMO transmission mode based at least in part on the presence of the restricted time-frequency zone, and transmitting to the access point a MIMO mode request message identifying the preferred MIMO transmission mode. In some of these latter embodiments, selecting the preferred MIMO transmission mode based at least in part on the presence of the restricted time-frequency zone may comprise estimating a signal-to-interference-plus-noise ratio for received signals based on the availability of the restricted time-frequency zone.

Embodiments of the present invention further include mobile terminals, such as the mobile terminal 500 pictured in FIG. 5, configured to carry out one or more of the methods described above, and variants thereof. Thus, an exemplary mobile terminal according to several embodiments of the invention generally comprises a receiver circuit configured to selectively operate in either a first or second processing mode for processing received data transmitted by an access point according to a first multiple-input multiple-output (MIMO) transmission scheme, wherein the second processing mode is less sensitive than the first processing mode to co-channel interfering signals transmitted according to a second MIMO transmission scheme differing from the first MIMO transmission scheme, as well as a control circuit configured to determine whether the mobile terminal has been allocated downlink time-frequency resources in a restricted time-frequency zone that is exclusive to downlink transmissions according to the first MIMO transmission scheme, and control the receiver circuit to process signals received in the allocated downlink time-frequency resources according to the first processing mode if the allocated downlink time-frequency resources are in the restricted time-frequency zone and otherwise processing signals received in the allocated downlink time-frequency resources according to the second processing mode. Those skilled in the art will appreciate that the term "receiver circuit," as used herein, may refer to a combination of analog and digital circuits, including one or more processors configured with appropriate software and/or firmware. Thus, for example, the term receiver circuit may encompass a portion of the baseband and control processing circuit 540 illustrated in FIGS. 5 and 6, as well as all or part of the receiver analog front-end circuitry 520 pictured in FIG. 5.

Other embodiments of the present invention include a WiMAX base station configured to carry out the techniques described herein, or, more generally, a wireless access point, for use in a wireless communications system in which allocated time-frequency resources may be selectively used according to a first MIMO scheme or a second MIMO transmission scheme (differing from the first). An exemplary access point 1200 is illustrated in FIG. 12, and includes two (or more) antennas 1250, a duplexer/switch 1205, an access point receiver circuit 1220, an access point transmitter circuit 1210, a control unit 1230, and a scheduling unit 1240. Either or both of control unit 1230 and scheduling unit 1240 may include memory of one or more types, or each may have access to shared memory 1245, as shown in FIG. 12. In some embodiments, the scheduling unit 1240 may comprise one or more microprocessors configured with appropriate software (e.g., stored in memory 1245) including programming instructions that, when executed by the one or more processors, cause the scheduling unit 1240 to, for at least a first scheduling instance, identify a first group of mobile terminals corresponding to the first MIMO transmission scheme and a second group of mobile terminals corresponding to the second MIMO transmission scheme, allocate time-frequency resources in a first pre-determined time-frequency zone exclusively to mobile terminals belonging to the first group, and allocate time-frequency resources in one or more additional pre-determined time-frequency zones to one or more mobile terminals belonging to the second group.

Figure 9:
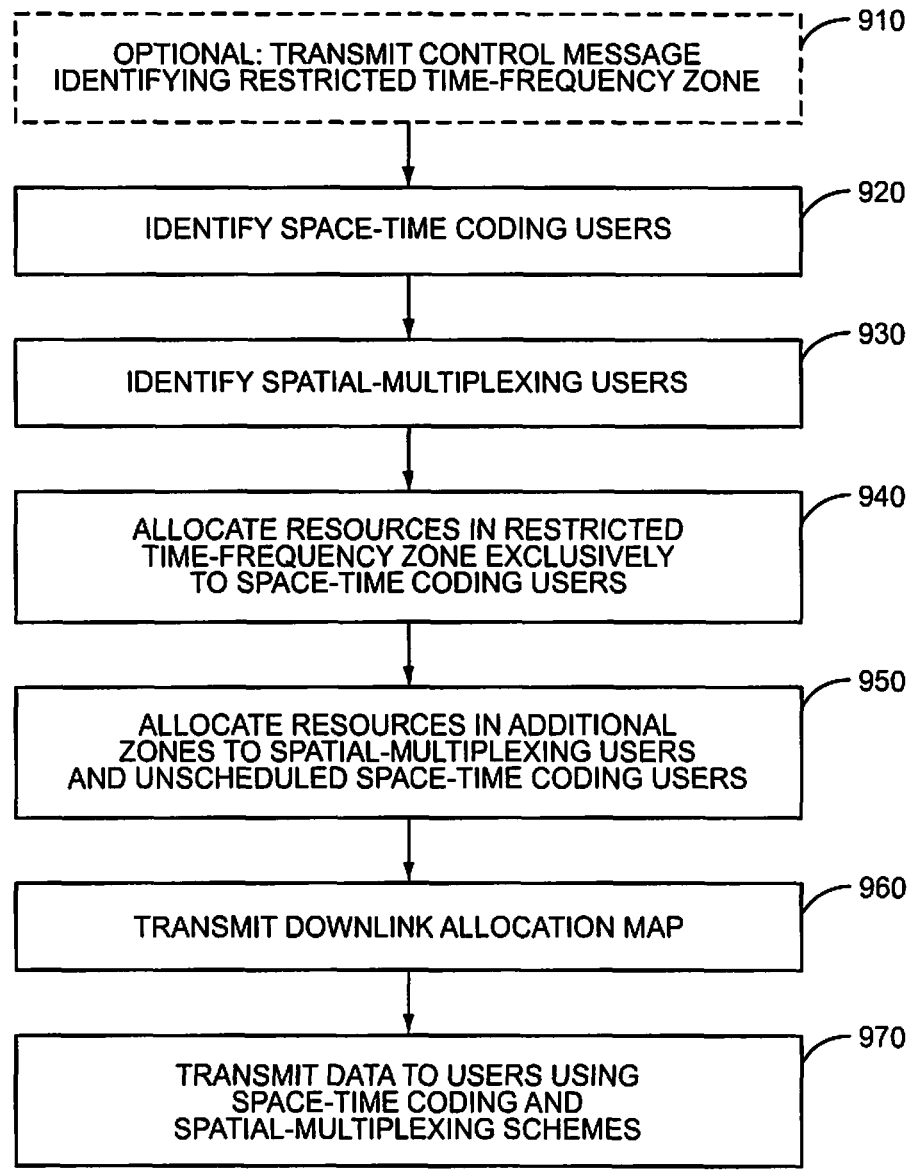

An exemplary method such as might be implemented in access point 1200 is illustrated in FIG. 9. The method begins, as shown at block 910, with the transmission of a control message identifying a restricted time-frequency zone. As discussed above, this broadcast message is optional, and may not be found in some systems. For a given scheduling instance, a scheduling unit identifies space-time coding users and spatial-multiplexing users, as shown at blocks 920 and 930. This identification may be based on signaling received from the mobile stations, indicating a preferred MIMO mode and/or indicating prevailing channel conditions for each mobile. At block 940, resources in the restricted time-frequency (e.g., a space-time-coding-only zone, such as an Alamouti-only zone) are allocated exclusively to space-time coding users. The selection of users for transmission in this zone may be based on signaling received from mobile stations, indicating the processing modes available at the mobile stations and their sensitivity to the MIMO transmissions used by interfering signals. As shown at block 950, resources in other zones are allocated to spatial multiplexing users and space-time coding users that were not assigned to the restricted zone. Finally, a downlink allocation map reflecting the downlink allocations is transmitted, as shown at block 960, and data is transmitted to each user according to a space-time coding or spatial multiplexing scheme, as appropriate.

Although the methods described above have been primarily focused on allocation of downlink time-frequency resources, those skilled in the art will appreciate that the techniques disclosed herein may be applied to uplink resource allocations as well, allowing the base station receiver to take advantage of advanced receiver processes for handling uplink transmissions in zones restricted to space-time coding users. Thus, broadly speaking, embodiments of the present invention include methods of allocating either uplink or downlink time-frequency resources to mobile terminals in a wireless communications system in which allocated time-frequency resources may be selectively used according to a first MIMO transmission scheme or a second MIMO transmission scheme, the method comprising, for at least a first scheduling instance, identifying a first group of mobile terminals corresponding to the first MIMO transmission scheme and a second group of mobile terminals corresponding to the second MIMO transmission scheme, allocating time-frequency resources in a first pre-determined time-frequency zone exclusively to mobile terminals belonging to the first group, and allocating time-frequency resources in one or more additional pre-determined time-frequency zones to one or more mobile terminals belonging to the second group.

In some embodiments, as described in some detail above, the allocated time-frequency resources are downlink time-frequency resources, in which case the method further comprises transmitting data to mobile terminals in the first and second groups using the first and second MIMO transmission schemes, respectively. In some of these embodiments, the method further comprises identifying a subset of the first group of mobile terminals capable of selecting between two or more receiver modes for processing transmissions according to the first MIMO transmission scheme, so that allocating time-frequency resources in the first pre-determined time-frequency zone exclusively to mobile terminals belonging to the first group comprises prioritizing allocations of time-frequency resources in the first pre-determined time-frequency zone to mobile terminals in the identified subset. In some of these embodiments, this subset of the first group of mobile terminals may be identified by receiving a terminal capability message from each of one more mobile terminals of the subset, each terminal capability message indicating that the corresponding mobile terminal is capable of selecting between two or more receiver modes for processing transmissions according to the first MIMO transmission scheme.

In some embodiments, identifying the first and second groups of mobile terminals for allocating the downlink frequency resources comprises identifying one or more mobile terminals capable of selecting between two or more receiver modes for processing transmissions according to the first MIMO transmission scheme, and assigning each of the one or more dual-receiver-mode mobile terminals to the first and second groups by determining which of the first and second MIMO transmission schemes will support a higher data rate to each mobile terminal, given the availability of the two or more receiver modes.

In some embodiments where the allocated time-frequency resources are uplink time-frequency resources, the method may further comprise processing signals received in the first pre-determined time-frequency zone according to a first receiver processing mode and processing signals received in the second pre-determined time-frequency zone according to a second receiver processing mode, wherein the second receiver processing mode is less sensitive than the first receiver processing mode to co-channel interfering signals transmitted according to one or more MIMO transmission schemes differing from the first MIMO transmission scheme.

In several of the above embodiments, the method may further comprise allocating time-frequency resources in the one or more additional pre-determined time-frequency zones to one or more mobile terminals that belong to the first group but are not allocated time-frequency resources from the first pre-determined time-frequency zone. Thus, not all mobile terminals scheduled to use space-time coded transmissions need be assigned to the restricted space-time-coding only zone. Of course, no spatial multiplexing users should be assigned to the restricted zone. As discussed in detail above, the first MIMO transmission scheme of the methods discussed above may comprise a space-time coding transmission scheme, such as Alamouti coding, while the second MIMO transmission scheme comprises a spatial multiplexing transmission scheme.

In some systems, any of the methods discussed above may further comprise the transmission of a broadcast control message indicating that the first pre-determined time-frequency zone corresponds exclusively to transmissions according to the first MIMO transmission scheme. In some systems, the mapping of time-frequency resources to the first pre-determined time-frequency zone is coordinated among a first access point, communicating with the first and second groups of mobile terminals, and one or more neighboring access points of the wireless communication system. In this way, it can be ensured that co-channel interfering signals from neighboring base stations, in all or substantially all of the restricted zone, are limited to space-time coded signals.

It is possible to define a MIMO scheme based on Alamouti coding that uses a space-frequency formulation, rather than the space-time formulation discussed in detail above. Those skilled in the art will appreciate that such a space-frequency formulation would involve diversity coding of symbols on adjacent frequency tones (subcarriers) of an Orthogonal Frequency-Division Multiplexing (OFDM) signal, rather than the coding of time-adjacent symbols as discussed above in connection with Equation (3). In this case, the preferred receiver to detect such space-frequency-coded signals, in the presence of like interferers, would be an space-frequency interference rejection combining (SFIRC) receiver. Accordingly, in some embodiments of the invention, mobile terminals to which space-frequency coded signals are being transmitted may be assigned exclusively to a restricted zone, while mobile terminals using other MIMO schemes are assigned to other zones. Likewise, mobile terminals capable of using a SFIRC processing mode may be configured to selectively use the SFIRC processing mode when allocated to a restricted zone, and to use another processing mode otherwise.

Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of allocating time-frequency resources to mobile terminals in a wireless communications system in which allocated time-frequency resources may be selectively used according to a first multiple-input multiple-output (MIMO) transmission scheme or a second MIMO transmission scheme that differs from the first MIMO transmission scheme, the method comprising, for at least a first scheduling instance:
   identifying a first group of mobile terminals corresponding to the first MIMO transmission scheme and a second group of mobile terminals corresponding to the second MIMO transmission scheme;
   allocating time-frequency resources in a first pre-determined time-frequency zone exclusively to mobile terminals belonging to the first group; and
   allocating time-frequency resources in one or more additional pre-determined time-frequency zones to one or more mobile terminals belonging to the second group;
   wherein the first MIMO transmission scheme comprises either a space-time or a space-frequency coding transmission scheme and the second MIMO transmission scheme comprises a spatial multiplexing transmission scheme.

2. The method of claim 1, wherein the allocated time-frequency resources are downlink time-frequency resources, the method further comprising transmitting data to mobile terminals in the first and second groups using the first and second MIMO transmission schemes, respectively.

3. The method of claim 2, further comprising identifying a subset of the first group of mobile terminals capable of selecting between two or more receiver modes for processing transmissions according to the first MIMO transmission scheme, and wherein allocating time-frequency resources in the first pre-determined time-frequency zone exclusively to mobile terminals belonging to the first group comprises prioritizing allocations of time-frequency resources in the first pre-determined time-frequency zone to mobile terminals in the identified subset.

4. The method of claim 3, wherein identifying a subset of the first group of mobile terminals comprises receiving a terminal capability message from each of one or more mobile terminals of the subset, each terminal capability message indicating that the corresponding mobile terminal is capable of selecting between two or more receiver modes for processing transmissions according to the first MIMO transmission scheme.

5. The method of claim 2, wherein identifying the first and second groups of mobile terminals comprises:
   identifying one or more mobile terminals capable of selecting between two or more receiver modes for processing transmissions according to the first MIMO transmission scheme; and
   assigning each of the one or more dual-receiver-mode mobile terminals to the first and second groups by determining which of the first and second MIMO transmission schemes will support a higher data rate to each mobile terminal, given the availability of the two or more receiver modes.

6. The method of claim 1, wherein the allocated time-frequency resources are uplink time-frequency resources, the method further comprising processing signals received in the first pre-determined time-frequency zone according to a first receiver processing mode and processing signals received in the second pre-determined time-frequency zone according to a second receiver processing mode, wherein the second receiver processing mode is less sensitive than the first receiver processing mode to co-channel interfering signals transmitted according to one or more MIMO transmission schemes differing from the first MIMO transmission scheme.

7. The method of claim 1, further comprising allocating time-frequency resources in the one or more additional pre-determined time-frequency zones to one or more mobile terminals that belong to the first group but are not allocated time-frequency resources from the first pre-determined time-frequency zone.

8. The method of claim 1, further comprising transmitting a broadcast control message indicating that the first pre-determined time-frequency zone corresponds exclusively to transmissions according to the first MIMO transmission scheme.

9. The method of claim 1, further comprising coordinating the mapping of time-frequency resources to the first pre-determined time-frequency zone among a first access point, communicating with the first and second groups of mobile terminals, and one or more neighboring access points of the wireless communication system, so that co-channel interfering signals from the neighboring access points, in all or substantially all of the first pre-determined time-frequency zone, are limited to signals transmitted according to the first MIMO scheme.

10. A wireless access point for use in a wireless communications system in which allocated time-frequency resources may be selectively used according to a first multiple-input multiple-output (MIMO) transmission scheme or a second MIMO transmission scheme that differs from the first MIMO transmission scheme, the access point comprising two or more antennas, a transmitter section, a receiver section, and a scheduling unit operatively connected to the transmitter section and receiver section and configured to, for at least a first scheduling instance:
   identify a first group of mobile terminals corresponding to the first MIMO transmission scheme and a second group of mobile terminals corresponding to the second MIMO transmission scheme;
   allocate time-frequency resources in a first pre-determined time-frequency zone exclusively to mobile terminals belonging to the first group; and
   allocate time-frequency resources in one or more additional pre-determined time-frequency zones to one or more mobile terminals belonging to the second group;
   wherein the first MIMO transmission scheme comprises either a space-time or a space-frequency coding transmission scheme and the second MIMO transmission scheme comprises a spatial multiplexing transmission scheme.

11. The wireless access point of claim 10, wherein the allocated time-frequency resources are downlink time-frequency resources and wherein the transmitter section is configured to selectively transmit data via the two or more antennas according to either the first or second MIMO transmission schemes, the wireless access point further comprising a control unit configured to transmit data to mobile terminals in the first and second groups, according to the allocated time-frequency resources, using the first and second MIMO transmission schemes, respectively.

12. The wireless access point of claim 11, wherein the scheduling unit is further configured to identify a subset of the first group of mobile terminals capable of selecting between two or more receiver modes for processing transmissions according to the first MIMO transmission scheme and to prioritize allocations of time-frequency resources in the first pre-determined time-frequency zone to mobile terminals in the identified subset.

13. The wireless access point of claim 12, wherein the scheduling unit is configured to identify the subset of the first group of mobile terminals by receiving a terminal capability message from each of one or more mobile terminals of the subset, via the receiver section, each terminal capability message indicating that the corresponding mobile terminal is capable of selecting between two or more receiver processing modes for processing transmissions according to the first MIMO transmission scheme.

14. The wireless access point of claim 11, wherein the scheduling unit is further configured to:
   identify one or more mobile terminals capable of selecting between two or more receiver modes for processing transmissions according to the first MIMO transmission scheme; and
   assign each of the one or more dual-receiver-mode mobile terminals to the first and second groups by determining which of the first and second MIMO transmission schemes will support a higher data rate to each mobile terminal, given the availability of the two or more receiver modes.

15. The wireless access point of claim 10, wherein the allocated time-frequency resources are uplink time-frequency resources, wherein the receiver section is configured to selectively process received signals transmitted according to the first MIMO transmission scheme using either a first receiver processing mode or a second receiver processing mode that is less sensitive than the first receiver processing mode to co-channel interfering signals transmitted according to one or more MIMO transmission schemes differing from the first MIMO transmission scheme, and wherein the receiver section is configured to process received signals in the first pre-determined zone using exclusively the first receiver processing mode.

16. The wireless access point of claim 10, wherein the scheduling unit is further configured to allocate time-frequency resources in the one or more additional pre-determined time-frequency zones to one or more mobile terminals that belong to the first group but are not allocated time-frequency resources from the first pre-determined time-frequency zone.

17. The wireless access point of claim 10, further comprising a control unit configured to transmit a broadcast control message, using the transmitter section, indicating that the first pre-determined time-frequency zone corresponds exclusively to transmissions according to the first MIMO transmission scheme.

18. The wireless access point of claim 10, wherein the scheduling unit is further configured to coordinate the mapping of time-frequency resources to the first pre-determined time-frequency zone among the first access point and one or more neighboring access points of the wireless communication system, so that co-channel interfering signals from the neighboring access points, in all or substantially all of the first pre-determined time-frequency zone, are limited to signals transmitted according to the first MIMO scheme.

19. A method in a wireless mobile terminal for processing received data transmitted by an access point according to a first multiple-input multiple-output (MIMO) transmission scheme, the method comprising, for at least a first scheduling instance:

determining whether the mobile terminal has been allocated downlink time-frequency resources in a restricted time-frequency zone that is exclusive to downlink transmissions according to the first MIMO transmission scheme; and processing signals received in the allocated downlink time-frequency resources according to a first processing mode if the allocated downlink time-frequency resources are in the restricted time-frequency zone and otherwise processing signals received in the allocated downlink time-frequency resources according to a second processing mode, wherein the second processing mode is less sensitive than the first processing mode to co-channel interfering signals transmitted according to a second MIMO transmission scheme differing from the first MIMO transmission scheme;

wherein the first MIMO transmission scheme comprises either a space-time or a space-frequency coding transmission scheme and the second MIMO transmission scheme comprises a spatial multiplexing transmission scheme.

20. The method of claim 19, wherein the first processing mode comprises a spatio-temporal interference rejection combining (IRC) receiver mode, in which spatial and temporal properties of interfering signals are used to characterize interference to the signals received in the allocated downlink time-frequency resources, and the second processing mode comprises a receiver mode in which temporal properties of interfering signals are not used to characterize the interference.

21. The method of claim 19, wherein determining whether the mobile terminal has been allocated downlink time-frequency resources in the restricted time-frequency zone comprises detecting an assigned time-frequency zone from a downlink allocation map transmitted by the access point, and comparing the assigned time-frequency zone to a pre-configured zone identifier corresponding to the restricted time-frequency zone and stored in memory of the mobile terminal.

22. The method of claim 19, wherein determining whether the mobile terminal has been allocated downlink time-frequency resources in the restricted time-frequency zone comprises:

receiving a control message transmitted by the access point, the control message comprising an identifier for the restricted time-frequency zone;

detecting an assigned time-frequency zone from a downlink allocation map transmitted by the access point; and comparing the assigned time-frequency zone to the identifier for the restricted time-frequency zone.

23. The method of claim 19, further comprising transmitting a terminal capability message to the access point, the terminal capability message indicating that the mobile terminal is capable of selecting between two or more receiver modes for processing transmissions according to the first MIMO transmission scheme.

24. The method of claim 19, further comprising:

selecting a preferred MIMO transmission mode based at least in part on the presence of the restricted time-frequency zone; and transmitting to the access point a MIMO mode request message identifying the preferred MIMO transmission mode.

25. The method of claim 24, wherein selecting the preferred MIMO transmission mode based at least in part on the presence of the restricted time-frequency zone comprises estimating a signal-to-interference-plus-noise ratio for received signals based on the availability of the restricted time-frequency zone.

26. A wireless mobile terminal comprising:

a receiver circuit configured to selectively operate in either a first or second processing mode for processing received data transmitted by an access point according to a first multiple-input multiple-output (MIMO) transmission scheme, wherein the second processing mode is less sensitive than the first processing mode to co-channel interfering signals transmitted according to a second MIMO transmission scheme differing from the first MIMO transmission scheme, and wherein the first MIMO transmission scheme comprises either a space-time or a space-frequency coding transmission scheme and the second MIMO transmission scheme comprises a spatial multiplexing transmission scheme; and a control circuit configured to:

determine whether the mobile terminal has been allocated downlink time-frequency resources in a restricted time-frequency zone that is exclusive to downlink transmissions according to the first MIMO transmission scheme; and control the receiver circuit to process signals received in the allocated downlink time-frequency resources according to the first processing mode if the allocated downlink time-frequency resources are in the restricted time-frequency zone and otherwise processing signals received in the allocated downlink time-frequency resources according to the second processing mode.

27. The wireless mobile terminal of claim 26, wherein the first processing mode comprises a spatio-temporal interference rejection combining (IRC) receiver mode, in which spatial and temporal properties of interfering signals are used to characterize interference to the signals received in the allocated downlink time-frequency resources, and the second processing mode comprises a receiver mode in which temporal correlation properties of interfering signals are not used to characterize the interference.

28. The wireless mobile terminal of claim 26, wherein the control circuit is configured to determine whether the mobile terminal has been allocated downlink time-frequency resources in the restricted time-frequency zone by detecting an assigned time-frequency zone from a downlink allocation map transmitted by the access point, and comparing the assigned time-frequency zone to a pre-configured zone identifier corresponding to the restricted time-frequency zone and stored in memory of the mobile terminal.

29. The wireless mobile terminal of claim 26, wherein the control circuit is configured to determine whether the mobile terminal has been allocated downlink time-frequency resources in the restricted time-frequency zone by:

receiving a control message transmitted by the access point, the control message comprising an identifier for the restricted time-frequency zone;

detecting an assigned time-frequency zone from a downlink allocation map transmitted by the access point; and comparing the assigned time-frequency zone to the identifier for the restricted time-frequency zone.

30. The wireless mobile terminal of claim 26, further comprising a transmitter circuit, wherein the control circuit is configured to transmit a terminal capability message to the access point, using the transmitter circuit, the terminal capability message indicating that the mobile terminal is capable of selecting between two or more receiver modes for processing transmissions according to the first MIMO transmission scheme.

31. The wireless mobile terminal of claim 26, wherein the control circuit is further configured to select a preferred MIMO transmission mode based at least in part on the presence of the restricted time-frequency zone and to transmit to the access point, using the transmitter circuit, a MIMO mode request message identifying the preferred MIMO transmission mode.

32. The wireless mobile terminal of claim 31, wherein the control circuit is configured to select the preferred MIMO transmission mode based at least in part on the presence of the restricted time-frequency zone by estimating a signal-to-interference-plus-noise ratio for received signals based on the availability of the restricted time-frequency zone and selecting the preferred MIMO transmission mode based on the estimated signal-to-interference-plus-noise ratio.

* * * * *

UNITED STATES PATENT AND TRADEMARK OFFICE
CERTIFICATE OF CORRECTION

PATENT NO. : 8,750,240 B2
APPLICATION NO. : 12/561711
DATED : June 10, 2014
INVENTOR(S) : Balachandran et al.

It is certified that error appears in the above-identified patent and that said Letters Patent is hereby corrected as shown below:

On the Title Page, Item (75), under "Inventors", in Column 1, Line 3, delete "Ramesh," and insert -- Ramesh, Deceased --, therefor.

In the Specification

In Column 1, Line 60, delete "ratio" and insert -- noise ratio --, therefor.

In Column 4, Line 13, delete "Frame 9" and insert -- Fig. 9 --, therefor.

In Column 6, Line 14, in Equation (1), delete "R=HS+n" and insert -- R=HS+n, --, therefor.

In Column 7, Lines 9-17, in Equation (7), delete "
$$\hat{n} = \begin{bmatrix} vec(\mathcal{H}(n)) \\ vec(\mathcal{J}(n)) \end{bmatrix}$$
$$z_k = \begin{bmatrix} x_{k,1} \\ M \\ x_{k,M} \\ y_{k,1} \\ M \\ y_{k,M} \end{bmatrix}$$
" and insert --
$$\hat{n} = \begin{bmatrix} vec(\mathcal{H}(n)) \\ vec(\mathcal{J}(n)) \end{bmatrix}$$
$$z_k = \begin{bmatrix} x_{k,1} \\ \vdots \\ x_{k,M} \\ y_{k,1} \\ \vdots \\ y_{k,M} \end{bmatrix}$$
--, therefor.

Signed and Sealed this
Twenty-eighth Day of October, 2014

Michelle K. Lee
*Deputy Director of the United States Patent and Trademark Office*

In Column 7, Line 31, Equation (8), delete "$C = [\ a_0 L\ \ a_{M-1}\ \ b_0\ \ L\ \ b_{M-1}\ ],$" and insert -- $\mathbf{C} = [\ \mathbf{a}_0 \cdots\ \mathbf{a}_{M-1}\ \ \mathbf{b}_0\ \cdots\ \mathbf{b}_{M-1}\ ],$ --, therefor.

In Column 8, Line 44, delete "Kiang" and insert -- Klang --, therefor.

In Column 10, Line 1, delete "OL-MAP)." and insert -- DL-MAP). --, therefor.

In Column 10, Line 62, delete "843," and insert -- 834, --, therefor.